United States Patent Office 3,517,504
Patented June 30, 1970

3,517,504
CONNECTION MEANS FOR AIR INJECTION PUMP
Tosiyuki Sakamoto, Himeji, Japan, assignor to Mitsubishi Denki Kabushiki Kaisha, Tokyo, Japan
Filed Dec. 12, 1967, Ser. No. 689,882
Claims priority, application Japan, Dec. 20, 1966 (utility models), 41/115,899, 42/8,496, 42/8,497
Int. Cl. F01n *3/10;* H02k *9/06*
U.S. Cl. 60—30     9 Claims

ABSTRACT OF THE DISCLOSURE

An air injection pump comprises a housing erected on one of two brackets of a charging generator equipped on an automobile and a rotor directly connected to the rotary shaft of the generator. An intake port is provided on the other bracket of the generator and an opening formed on the one bracket communicates the interior of the generator with a suction compartment in the pump. In operation air is introduced through the intake port into the interior of the generator to cool it and then through the opening into the suction compartment in the pump. The sucked air is injected through a delivery compartment into a waste gas pipe from the associated engine for the purpose of burning incompletely burned harmful ingredients in the waste gas.

---

The invention relates to connection means for mounting an air injection pump on an automobile.

Lately there has been proposed the use of an air injection pump driven by an automobile engine for the purpose of decreasing harmful ingredients such as hydrocarbon gases and carbon monoxide gas contained in the waste gas exhausted from the engine. The air injected into the waste gas pipe serves to further burn the incompletely burned gases such as hydrocarbon and carbon monoxide gases within the waste gas pipe thereby to decrease the harmful ingredients in the waste gas.

If such an air injection pump is equipped, as a single unit, on the associated automobile separately from appurtenances, for example, such as a fuel pump, a starting motor, a charging generator, etc. already equipped on the automobile then the associated engine room will become undesirably complicated. Therefore, it is desirable to mount the air injection pump integrally with any of such appurtenances. Also it is desirable if mounting of the air injection pump integral with the particular one of the appurtenances of the engine may cause the said appurtenance to become simplified in construction. For example, it is desirable to be able to omit any of the appurtenances of the engine through mounting of the air injection pump on the particular one of the appurtenances.

Further, an air injection pump is required to be always put in operation during the operation of the associated automobile engine. Thus it is desirable to mount the air injection pump to the particular one of the engine's appurtenances maintained in operation during the operation of the engine whereby a driving mechanism for that particular appurtenance can also be used to drive the air injection pump. If it is possible to do so, a special connection mechanism for operatively connecting the air injection pump to the engine can be omitted resulting in the simplification of the associated engine room.

Accordingly, it is the primary object of the invention to provide new and improved connection means for mounting an air injection pump on an automobile which means are effective for causing the particular one of the engine appurtenances having mounted thereto the air injection pump to be compact and simple in construction.

It is another object to provide connection means of the type described in the preceding paragraph and capable of omitting a separate connection mechanism for operatively connecting the air injection pump to the associated engine.

Briefly, the invention accomplishes the above cited objects by the provision of connection means for operatively connecting an air injection pump to a charging generator for charging a battery equipped on an automobile. The charging generator comprises a rotary shaft driven by an automobile engine and a first and a second bracket for rotatably carrying the rotary shaft. The air injection pump comprises a housing rigidly secured on the external surface of the first generator bracket and a rotor within the housing driven by the engine. The first bracket of the generator is provided with an opening providing a suction port for the pump and the second bracket is provided with an air intake port. In operation, the surrounding air is introduced through the air intake port into the interior of the generator to cool it and then through suction port into the air injection pump. The air sucked by the pump is injected into a waste gas pipe from the engine.

Preferably the rotor of the air injection pump may directly be connected to the rotary shaft of the charging generator.

The invention will become more apparent from the following detailed description taken in conjunction with the accompanying drawing in which.

Figure 1:
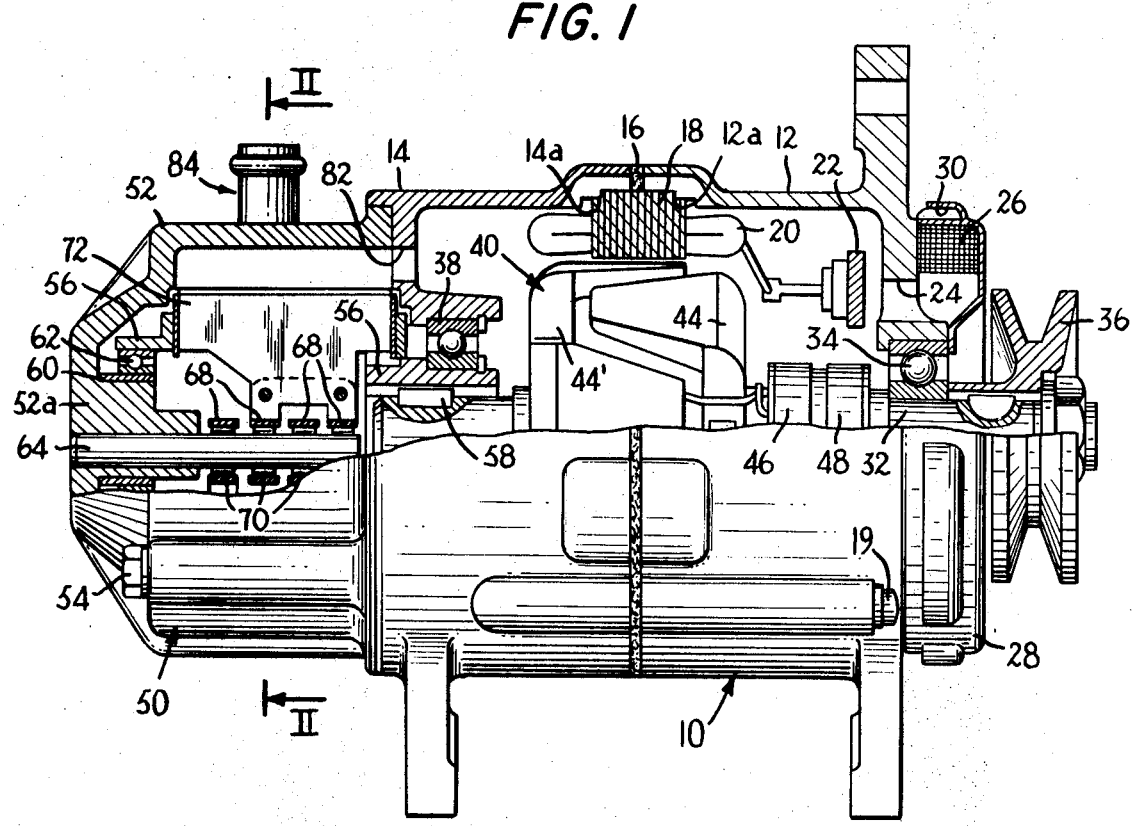
FIG. 1 is a front elevational view, partly in section of an air injection pump integrally mounted on a charging generator in accordance with the teachings of the invention.

Referring now to the drawing, it is seen that a charging generator of alternating current, rotary field type generally designated by the reference numeral 10 comprises a pair of brackets 12 and 14 disposed in abutting opposite relationship to form a housing with an annular packing 16 sandwiched between the opposed ends. The packing 16 serves to prevent the surrounding air from entering the housing through the junction of both brackets. The brackets 12 and 14 are provided on the internal surfaces of the jointed end portions with a pair of annular shoulders 12a and 14a respectively between which an annular magnetic core 18 of a stationary armature is carried. The armature core 18 is maintained in place by bolts 19 (one of which is illustrated in FIG. 1) fastening the brackets 12 and 14 to each other. The armature includes electric windings 20 inductively disposed on the core 18. The windings 20 may be preferably of three phase type and connected in delta connection. Secured on the internal surface of the bracket 12 is a rectifier device 22 which may be preferably composed of six semiconductor rectifiers connected in a three phase, full wave rectifier bridge. The rectifier device 22 rectifies an output from the armature windings 20 and supplies the rectified output to a battery 110 (FIG. 3) equipped on the associated automobile and used as a source of direct current. Namely the charging generator 10 charges the battery.

As shown in FIG. 1, the bracket 12 is provided on the end wall remote from the opposite bracket 14 with an annular intake port 24 permitting the surronding air to enter the housing or the interior of the generator 10 for cooling purpose.

In order to prevent ingress of foreign matters such as dust into the interior of the generator 10 an air filter 26 of any suitable filtering material such as filter paper or wire netting is operatively associated with the intake port 24 and secured on the external surface of the end face of the bracket 12 by a filter retainer 28 provided on the outer peripheral wall with a plurality of air intake windows 30.

The generator 10 further includes a rotary shaft 32 extending through the bracket 12 into the housing and journalled by a bearing 34 disposed in the end face of the bracket 12. The rotary shaft 32 has mounted at the exposed end a pulley 36 adapted to be driven by an internal combustion engine 100 (FIG. 3) equipped on the automobile through an endless belt 114 in the known manner. The shaft 32 is rotatably carried at the other end by the bracket 14 through a bearing 38 and has rigidly mounted on that portion disposed within the housing a rotary field assembly generally designated by the reference numeral 40. The rotary field assembly 40 includes a field winding (not shown) and a pair of comb-shaped field cores 44 and 44' disposed so as to embrace the winding from both sides thereof with the field cores facing the armature core 18 to form a very narrow gap therebetween. Further a pair of slip rings 46 and 48 are secured on the rotary shaft 32 between the field assembly and the bearing 34 for the purpose of supplying an electric energy to the field winding 42.

Figure 2:
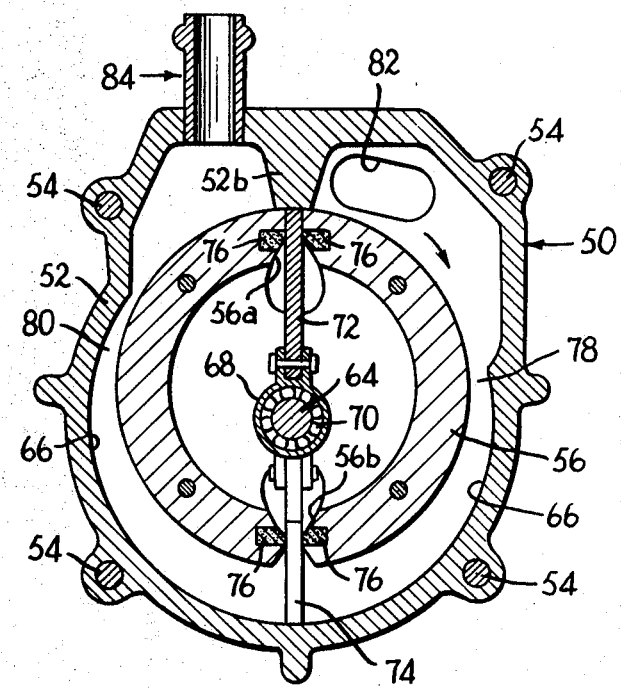
FIG. 2 is a cross sectional view taken along the line of II—II of FIG. 1.

The invention contemplates to mount an air injection pump of the type as previously described to the charging generator 10. The air injection pump generally designated by the reference numeral 50 includes a housing 52 rigidly secured to the bracket 14 on the external surface of the end wall remote from the bracket 12 by bolts 54. A rotor 56 in the form of a hollow cylinder as best shown in FIG. 2 is disposed within the housing 52 so as to extend substantially throughout the length of the latter until that end portion thereof near to the generator 10 decreases in diameter and projects into between the internal peripheral surface of the bearing 38 and the external peripheral surface of the adjacent end of the rotary shaft 32 to be fitted onto the shaft. The rotor 56 then is keyed at 58 to the rotary shaft 32 and carried by the bearing 38 for rotational movement along with the shaft. The other end portion remote from the rotary shaft 32 of the rotor 56 also is decreased in diameter and rotatably supported to a guide ring 60 through a bearing 62. The guide ring 60 is fitted onto a supporting protrusion 52a integral with that end wall of the housing 52 remote from the generator 10.

As shown in FIG. 1, the protrusion 52a has fitted thereinto a guide shaft 64 the axis of which is positioned in parallel relationship but offset with respect to the axis of the rotary shaft 32. Thus the shaft 64 is eccentric with the longitudinal axis of the hollow rotor 56. As shown in FIG. 2, the hollow rotor 56 is provided on the wall with a pair of longitudinal slots 56a and b located on a diametric plane thereof passing through a point on the wall nearest to or farthest from the axis of the guide shaft 64 for the purpose as will be apparent hereinafter. The housing 52 has an internal wall surface including one portion whose cross sectional profile forms a circular segment having a center on the axis of the guide shaft 64 providing a sliding surface 66 and a longitudinal partition 52b projecting in the said diametrical plane from the internal wall surface until it slidably contact the outer wall surface of the rotor 56.

A plurality of spaced guide sleeves 68 are rotatably fitted onto the guide shaft 64 through the respective bearings 70 and a pair of diametrically opposite vanes 72 and 74 extend from the plurality of guide sleeves 68 and radially and axially of the axis of the guide shaft so as to be hermetically inserted into the respective slots 56a and b. The vanes are so dimensioned that they normally project from the slots to slidably contact the entire sliding surface 66 in operation while either of them as positioned on its position illustrated at the vane 72 is substantially flush with the external peripheral surface of the rotor 56 and contacts the partition 52b. A pair of anti-friction pieces 76, 76 disposed in opposite relationship on the opposite sides of each slot 56 or b serves to slidably sandwich the associated vanes 72 or 74. The piece 76 may be preferably of graphite or the like. The vanes 72 and 74 divide an annular space formed between the housing and rotor 52 and 56 respectively into a suction and a delivery compartment 78 and 80 respectively.

Figure 3:
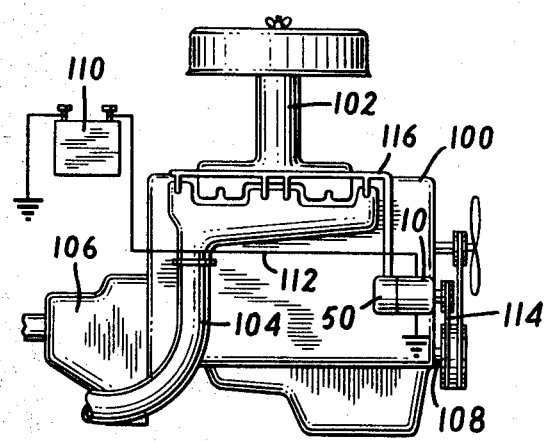
FIG. 3 is a side view of an internal combustion engine including the combined generator, air pump and injection means into the engine exhaust manifold according to the invention.

As shown in FIGS. 1 and 2, a suction port 82 is formed on the end wall of the bracket 14 so as to open into the suction compartment 78 in the air injection pump 50. Thus the port 82 serves not only to communicate the interior of the generator 10 with the suction compartment 78 of the air injection pump but also serves as an exhaust port through which a cooling air is exhaust from the generator 10 after it has cooled the latter. A delivery pipe 84 is connected to the delivery compartment 80 in the pump 50 for the purpose of injecting air from the pump 50 into a waste gas pipe 104 (FIG. 3).

When the associated engine 100 is rotating the rotary shaft 32 of the generator 10 is driven through the pulley 36. This causes the rotary field assembly 40 to be rotated whereby the generator 10 produces an alternating current voltage which, in turn, charges a battery 110 after having been rectified by the rectifier device 22. Also the rotation of the rotary shaft 32 causes the rotor 56 and therefore the two vanes 72 and 74 of the air injection pump 50 to be rotated in the direction of the arrow shown in FIG. 2 whereby air is repeatedly transferred from the suction compartment 78 to the delivery compartment 80 and injected into a waste gas pipe from the engine to re-burn harmful ingredients such as hydrocarbon gases, carbon monoxide gas, etc. contained in the waste gas to decrease their contents.

Under these circumstances, a negative pressure is predominant within the suction pump compartment 78 due to the delivery of air from the latter. This permits air to be sucked from the interior of the generator 10 into the suction compartment 78. Namely the negative pressure performs the succeeding pumping operation. The air thus sucked by the suction compartment 78 is what entered the interior of the generator 10 through the intake windows 30 and intake port 24 and cooled the rectifier device 22, the armature winding 20, the field winding, etc.

Thus it will be appreciated that the air injection pump 50 is operated to introduce air into the interior of the generator 10 for the purpose of cooling the rectifier device 22, the armature winding 20, and the field winding resulting in the unnecessity of providing special means for cooling the generator. For example instead of a pulley with a fan previously used to drive and cool the generator, the pulley 36 very simple in construction can be used.

Since the air injection pump 50 is provided for reburning the harmful ingredients in the waste gas to decrease their contents, it is required to be continuously put in operation during the operation of the engine. On the other hand, the charging generator 10 is also continuously put in operation during the operation of the engine for the purpose of charging the battery. Therefore with the rotor 56 of the pump 50 directly connected to the rotary shaft 32 of the generator 10, as previously described, it is not required to provide a special connecting mechanism for operatively connecting the rotor 56 to the engine to drive the rotor by the engine. This leads to the simplification of the mechanism for driving the appurtenances of the engine.

In addition, that end of the pump rotor 56 near to the generator 10 is fitted into between the bearing 38 disposed in the bracket 14 and the rotary shaft 32 and fixed on the shaft through the key 58 against relative rotation as previous described. This eliminates not only the necessity of providing a special mechanism for driving the rotor 56 but also the bearing 38 rotatably support both the rotary shaft 32 of the generator 10 and the rotor 56. Therefore, a bearing for journalling that end of the rotor 56 near to the generator 10 is omitted leading to the simplifying of mounting.

What I claim is:

1. In combination: an electric generator having a housing; means for forcing cooling air through said housing during operation of said generator to cool said generator and thereby preheat said cooling air; means defining an exhaust gas passage for receiving incompletely burned products of combustion; and delivery means for delivering the preheated air to said exhaust gas passage; whereby said preheated air is supplied to said incompletely burned products of combustion for burning thereof.

2. The combination according to claim 1, wherein said electric generator includes a rotatably mounted shaft; said means for forcing cooling air through said housing comprises an air injection pump having a rotatably mounted rotor; and connecting means for fixedly connecting said shaft to said rotor to enable said rotor and said shaft to rotate together.

3. The combination according to claim 2, wherein said air injection pump includes a housing secured to the generator housing; the pump housing and said generator housing having a common end wall; a cooling air inlet in said generator housing; an opening in said common end wall comprising both a preheated air outlet in said generator housing and a pump inlet in said pump housing; and wherein said delivery means includes a pump outlet in said pump housing;

4. The combination according to claim 3, wherein said air injection pump includes a cylindrical pump chamber containing said rotor therein and having a longitudinal axis eccentric to the longitudinal axis of rotation of said rotor, a guide shaft mounted on said pump housing and projecting into said cylindrical pump chamber concentric with said longitudinal axis thereof, a plurality of pump vanes rotatably mounted on said guide shaft, and said rotor comprises a hollow cylinder concentrically mounted with said shaft of said generator and having radial slots therein slidably receiving said pump vanes, whereby during operation of said generator the rotor is rotationally driven to effect rotation of said pump vanes.

5. The combination according to claim 4, including an air filter disposed upstream from said cooling air inlet.

6. In combination: an electric generator having a housing and a rotatably mounted shaft; an air injection pump having a housing containing an inlet in communication with the generator housing for drawing cooling air through said housing during operation of said generator to cool said generator and thereby preheat said cooling air and an outlet, and a rotor connected to said shaft; an internal combustion engine connected to rotationally drive said shaft which in consequence rotationally drives said rotor; means defining an exhaust gas passage for receiving incompletely burned products of combustion from said internal combustion engine; and a conduit interconnecting the pump outlet with said exhaust gas passage; whereby during operation of said internal combustion engine, cooling air is drawn through said generator housing to cool said generator and thereby preheat said cooling air and the preheated air is supplied to said incompletely burned products of combustion exhausted from said internal combustion engine for burning same.

7. The combination according to claim 6, wherein said pump housing is secured to said generator housing; the pump housing and said generator housing having a common end wall; a cooling air inlet in said generator housing; an opening in said common end wall comprising both a preheated air outlet in said generator housing and the pump inlet in said pump housing.

8. The combination according to claim 7, wherein said air injection pump includes a cylindrical pump chamber containing said rotor therein and having a longitudinal axis eccentric to the longitudinal axis of rotation of said rotor, a guide shaft mounted on said pump housing and projecting into said cylindrical pump chamber concentric with said longitudinal axis thereof, a plurality of pump vanes rotatably mounted on said guide shaft, and said rotor comprises a hollow cylinder concentrically mounted with said shaft of said generator and having radial slots therein slidably receiving said pump vanes, whereby rotation of said rotor effects rotation of said pump vanes.

9. The combination according to claim 7, including an air filter disposed upstream from said cooling air inlet.

References Cited

UNITED STATES PATENTS

| 1,778,036 | 10/1930 | Noble | 290—1.3 |
| 2,546,448 | 3/1951 | Hayden | 310—62 |
| 2,634,379 | 4/1953 | Brainard | 310—62 |
| 2,864,960 | 12/1958 | Linde | 60—30 |
| 3,392,523 | 7/1968 | Hyde | 60—30 |

CARLTON R. CROYLE, Primary Examiner

D. HART, Assistant Examiner

U.S. Cl. X.R.

290—1; 310—62, 263